Figure 1A:
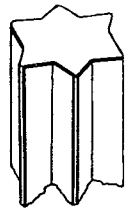

May 15, 1962 C. BEURTHERET 3,034,975
NUCLEAR REACTOR
Filed Feb. 10, 1956 2 Sheets-Sheet 1

Inventor
CHARLES BEURTHERET

By
Stone, Boyden & Frack
Attorneys

May 15, 1962 C. BEURTHERET 3,034,975
NUCLEAR REACTOR
Filed Feb. 10, 1956 2 Sheets-Sheet 2

Inventor
CHARLES BEURTHERET
By
Stone, Boyden & Mack
Attorneys 3,034,975
NUCLEAR REACTOR
Charles Beurtheret, St. Germain en Laye, France, assignor to Compagnie Française Thomson-Houston, Paris, France, a French body corporate
Filed Feb. 10, 1956, Ser. No. 564,768
Claims priority, application France Feb. 16, 1955
5 Claims. (Cl. 204—193.2)

This invention relates to nuclear reactors of high power intended for feeding heat engines, and into which the fissionable material is fed in the form of small metal bars provided with a protective casing or covering. These small bars are immersed in a liquid, which acts to slow up the functioning of the reactor, and serves in other respects as a vehicle to carry the heat energy generated in the fissionable mass. According to the constitution of the reactor and the degree of richness of the fissionable material, this liquid can be, for example, heavy water or ordinary water, or any other liquids whose properties are in accordance with the working conditions of the reactor.

It is evident that the heat exchange between the surface of the covered bars and the liquid, constitutes an essential limiting factor to the power of the reactor and it is well known that this limitation is linked with the commencement of ebullition in contact with the bars, the presence of a large quantity of vapour rendering contact with the liquid uncertain. If the body to be cooled is the centre of an internal generation of energy, the temperature of each of its elements of volume is only limited by the permanent evacuation of the heat flow passing through this point. The accidental stopping of the calorific flow on an element of the external surface therefore immediately causes a local increase of the temperature.

Now, the exchange of heat by ebullition in contact with a hot surface is a non-linear phenomenon, of which the efficiency passes through a very distinct maximum when the temperature of the surface passes beyond that of the ebullition of the liquid by some tens of degrees centigrade only. If this small separation comes to be passed at any point, the loss of thermal contact is final: this is "calefaction." The local heating spreads rapidly to neighbouring elements and the temperature rises until the structure is destroyed.

Great precautions are taken in order to avoid this dangerous phenomenon and it is well known that; on the one hand, it is possible to avoid; the appearance of ebullition on the bars up to a certain point, by increasing notably the pressure of the liquid and by forcing it to circulate rapidly in contact with the bars—thereby constituting reactors of the "pressurised water" type.

On the other hand, ebullition in contact with the bars can be tolerated in conditions which limit the flow of heat in the most loaded zone, to a value remote enough from the critical flow of heat. Thus there are constituted certain types of "Reactor Distillers."

The present invention, has for an object to provide a process and means for avoiding calefaction in nuclear reactors and for improving their efficiency.

The reactor according to the invention is characterised by the combination of the following means, taken together as a whole or in part.

(1) The casing or covering of each small bar, which is generally cylindrical, has an exterior form fashioned in such a way that it comprises large corrugations or protuberances, enlarging the surface of contact with the liquid by about 2 to 4 times, and in addition satisfying the following considerations.

(a) This casing is constructed in its mass from a metal, chosen for its high thermal conductivity from among those which are suitable for the working of the reactor, this metal being possibly protected on its outer face by a thin layer of another metal, which is not attacked by the liquid of the cooler under working conditions.

(b) The smallest dimension of the corrugations is large compared with the bubbles of vapour, which form in contact with them in the liquid cooler, at the estimated pressure under working conditions. It results from this essential characteristic of the invention that each element of the external surface of the casing is thermally connected with the neighbouring elements and extends sufficiently in order to protect them, by transverse thermal conductivity against the risk of local calefaction.

(c) The form of the corrugations, according to the invention, can vary within wide limits which are principally fixed by the possibilities of construction with the usable metals. Some simple forms such as with large longitudinal or transverse ribs or fins, which will be described hereafter, are already very effective, but some more complex forms can also be used effectively. The preferable form in each case depends, moreover, on the conditions employed; the position of the bars in the reactor and direction of the liquid circulating around the bars.

The form, the volume and the disposition of the corrugations thus provided, have the effect of directing the turbulence of the emulsion of water and vapour into the spaces separating them, so that the bars thus equipped can be submitted, without danger, to a dissipation of heat much greater than that which produces the appearance of calefaction on a plain cylindrical bar and its extension to the whole of the bar.

(2) The general circulation in the reactor, of the mass of liquid, or at least all of the quantity of liquid particularly effected by the transfer of heat, is regulated by a pump system connected to temperature and pressure controls, in such a manner that the maximum temperature of the liquid next to the bars, remains notably less (for example 10°) than the temperature of ebullition of the liquid under the conditions of pressure existing in this zone.

It results from this characteristic of the invention that the whole of the vapour produced by the heat exchange in contact with the bars, condenses by direct contact, after a very brief passage in the circulating liquid, and that it is very hot liquid and not vapour, which leaves the active zone of the reactor, in spite of the fact that it is essentially by vapourisation that the transfer of heat is effected on contact with the bars.

(3) The reactor is made in such a way that the liquid surrounding the bars is in direct communication with an expanding volume comprising an open surface of liquid in contact with its vapour or with a controlled atmosphere of such a kind that the fluctuations of volume owing to local ebullition on the bars take place at constant pressure.

(4) The hot liquid leaving the reactor transmits its heat energy to a utilisation circuit, by any known means, for example direct vapourisation and condensation in a closed circuit, or a heat exchanger and secondary distiller. In both cases, it results, from the combination of means provided according to the invention, that the temperature of the utilisable vapour is only a little lower than that at which the initial transfer is effected in contact with the bars.

The combination of means according to the invention allows reactors of high power to benefit from the enhanced efficiency of the transfer of heat by vapourisation at the bars without having the inconvenient but essential "boiling water reactors" or the overrunning or swamping of the active part of the reactor by an enormous surplus of vapour which seriously affects its working.

The reactor according to the invention, appearing outwardly as a reactor of the "pressurized water" type, clearly lends itself to the supplying of a heat exchanger according to known arrangements. Its utilisation as a direct distiller is indicated hereafter by way of non-limiting examples.

Figure 3:
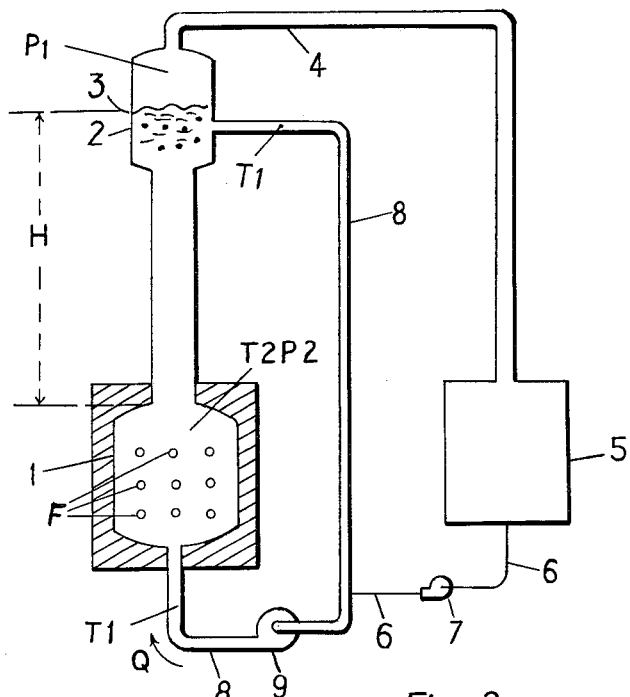
Figure 4:
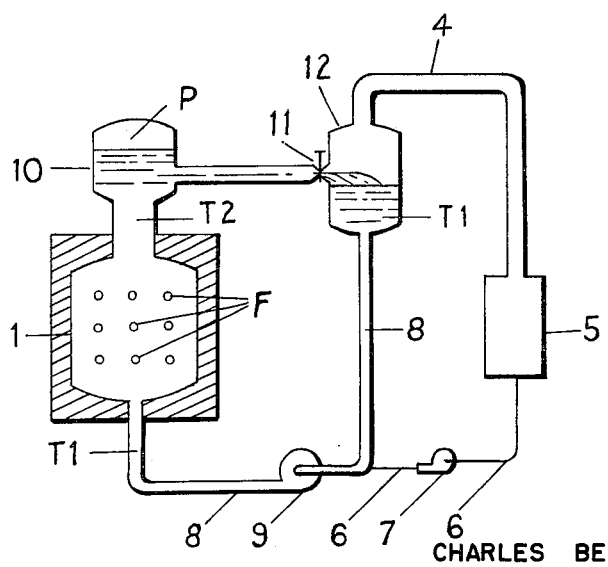

In order that the invention shall be more readily understood, reference will now be made to the accompanying drawings, in which:

FIGURES 1a, 1b and 2a to 2f show several forms of the corrugations or protuberances on bars of fissionable material, and FIGURES 3 and 4 are two general installation diagrams of reactors according to the invention. In FIGURE 3 the necessary pressure to ensure immediate condensation in the body of the liquid of the bubbles of vapour formed on contact with the bars, is obtained by means of a liquid column, in FIGURE 4 by means of a mass of inert gas.

Figure 1B:
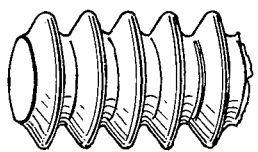
Figure 2A:
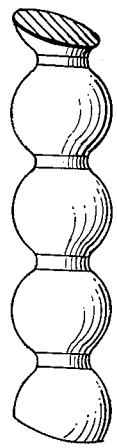
Figure 2B:
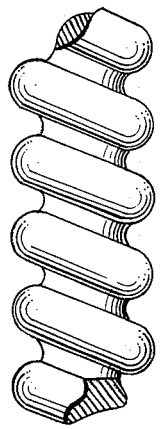
Figure 2C:
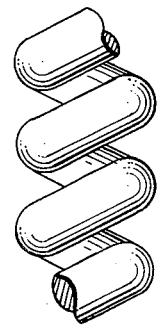
Figure 2D:
Figure 2E:
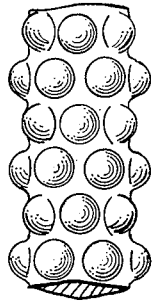
Figure 2F:
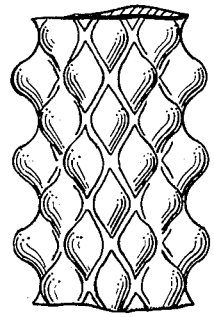

FIGURES 1a and 1b show embodiments in which the bar of fissionable material is provided with simple corrugations in the form of ribs or fins in a vertical plane. In FIGURE 1a the axis of the bar is also vertical and the ribs or fins are in consequence longitudinal, in FIGURE 1b the axis of the bar is horizontal and the ribs or fins are transverse. In the above two cases the ribs or fins are geometric solids developed by displacement (translation in FIGURE 1a and rotation in FIGURE 1b) of a triangle, with a relatively large base, whose vertex is rounded in order that it may be machined.

FIGURE 2 shows general forms of more complex corrugations. In FIGURE 2a the bar has been provided with transverse constrictions separating substantially spherical masses. In FIGURE 2b a rib of semi-circular section is wound around the bar in the manner of a screw thread. FIGURE 2c shows a bar twisted helically having the appearance of a spring with thick well-separated turns; in FIGURE 2d the bar has the shape of a twisted column. In FIGURE 2e projections of hemispherical form have been built up on the surface of the bar which retains its cylindrical form, and in FIGURE 2f the bar of cylindrical form has been formed with two series of helical grooves crossing one another at an angle, and defining between them teeth, each in the form of the frustum of a pyramid with a rounded top.

FIGURE 3 shows the installation arrangement of a "boiling water reactor" according to the invention. The reactor 1 is in direct communication with an expansion chamber 2 where the liquid boils, its mean free surface being indicated at 3. The vapour is conducted by the piping 4 to the heat energy utilising apparatus 5 (turbine or temperature exchanger for example) where it is condensed and sent by the piping 6, which may be provided with a pump 7 into the auxiliary circuit or piping 8. The fuel elements constructed according to this invention are indicated diagrammatically at F in the reactor. The liquid, cooled by ebullition in the expansion chamber 2 is re-introduced by the piping 8 and a circulating pump 9 into the reactor 1.

Let $P_1$ be the pressure of the vapour on utilisation, and $P_2$ the pressure existing at the outlet of the reactor. $\theta_1$ and $\theta_2$ represent the temperatures of ebullition at pressures $P_1$ and $P_2$ respectively.

In the example chosen, the difference in pressure $P_2-P_1$ is essentially due to a difference in height H of the reactor 1 and the expansion chamber 2, in which, in the vicinity of the free surface, the liquid is recovered by the piping 8 at a temperature $T_1$, adjacent to $\theta_1$, and introduced at this temperature to the entrance of the reactor, from which it leaves at a temperature $T_2$.

Let W be the power of the reactor in calories and Q the rate of flow of liquid, of specific heat C, being re-introduced into the reactor 1 by the piping 8.

The apparatus will operate according to the invention if the rate of liquid flow Q is sufficient so that the temperature difference $$T_2-T_1=\frac{W}{CQ}$$

is less than $\theta_2-\theta_1$ by a minimum of 10° C. necessary to ensure immediate condensation in the mass of water, of the vapour produced on contact with the bars.

In a variation of the same apparatus, shown in FIGURE 4, the reactor is surmounted by a dome 10 containing an inert gas, the liquid is sent via a pressure reducing valve 11 into a separator 12 where it partially evaporates. The vapour and the water leaving the separator respectively by the pipes 4 and 8 are treated as in the preceding example. The fuel elements constructed according to this invention are again indicated diagrammatically at F in the reactor.

Let $T_1$ be the temperature of the liquid on entering the reactor and $T_2$ that on leaving it, $\pi_2$ its vapor pressure at temperature $T_2$, and $P_2$ the pressure of the inert gas in the dome. The total pressure in the dome will be $P=\pi_2+P_2$. Let $\theta$ be the temperature of ebullition of the liquid under a pressure of P.

The temperature $\theta$ is always higher than that of $T_2$. The apparatus will operate according to the invention if the pressure $P_2$ of the gas is sufficient in order that the difference of temperature $\theta-T_2$ be higher than the minimum difference necessary in order to ensure immediate condensation, in the mass of water, of the vapour produced on contact with the bars.

It is evident that the pressure of gas $P_2$ in the case of FIGURE 4 plays the same part as the height H in the case of FIGURE 3 and that it is possible to obtain an operation according to the invention by a combination of the two processes.

Similarly it is evident that the apparatus utilising the heat energy may comprise an exchanger designed for operating directly with the liquid; in this case the primary installation is simplified whilst remaining according to the invention.

I claim:

1. A nuclear reactor arrangement, comprising a reaction chamber adapted to contain fuel elements of fissionable material and in which steam is produced by ebullition of water in contact with the surface of said fuel elements, a dome comunicating with and surmounting said reaction chamber and containing an inert gas, a separator communicating with said dome, a pressure reducing valve between said dome and said separator, a heat engine driven by the heat energy in the vapor developed by ebullition of the liquid in the dome, piping for conducting the vapor from said separator to said heat engine, piping from the separator to the reaction chamber for reintroducing into the reaction chamber liquid cooled by ebullition in the dome, a pump in said piping controlling the rate of circulation of the liquid through the reaction chamber so that the maximum temperature of the liquid in the region of the fuel elements remains less than the temperature of ebullition of the liquid under the conditions of pressure existing in this zone whereby vapor produced by contact of the liquid with said fuel elements rapidly condenses in the liquid adjacent to said fuel elements, piping including a pump for conducting the condensate from said heat engine to said piping from the separator, each of said fuel elements of fissionable material being of generally cylindrical form enclosed in an external metal casing, the surface of which is provided with a plurality of protuberances, the mean thickness of each protuberance being of substantially the same order of dimension as its radial height and the protuberances covering at least substantially 80% of the surface of the fuel element.

2. The arrangement as claimed in claim 1, wherein each fuel element is of generally cylindrical form provided with protuberances in the form of ribs on its external surface.

3. The arrangement as claimed in claim 1, wherein each fuel element is provided with a plurality of transverse constrictions separating protuberances consisting of substantially spherical masses arranged along its longitudinal axis.

4. The arrangement as claimed in claim 1, wherein each fuel element is provided with a rib of substantially semi-circular cross-section arranged helically around the external surface of the fuel element.

5. The arrangement as claimed in claim 1, wherein each fuel element is provided with protuberances of hemispherical form on the surface thereof.

References Cited in the file of this patent

UNITED STATES PATENTS

| | | |
|---|---|---|
| 2,743,225 | Ohlinger et al. | Apr. 24, 1956 |
| 2,773,823 | Goett | Dec. 11, 1956 |
| 2,824,056 | Leverett | Feb. 18, 1958 |
| 2,831,807 | McGarry | Apr. 22, 1958 |
| 2,841,545 | Zinn | July 1, 1958 |

FOREIGN PATENTS

| | | |
|---|---|---|
| 1,060,761 | France | Nov. 27, 1953 |
| 1,082,673 | France | June 23, 1954 |

OTHER REFERENCES

The Reactor Handbook, vol. 2, Engineering Atomic Energy Commission. Declassified edition May 1955. Pp. 451, 452, 456.

Electrical World, June 13, 1955, pp. 71–74.

U.S. Atomic Energy Commission, CF–53–2–112 Boiler Reactor Operation: Part II. By P. R. Kasten, Feb. 12, 1953. Pp. 2–5.

Proceedings of the International Conference on the Peaceful Uses of Atomic Energy, vol. 3, United Nations, New York, 1955. Held in Geneva Aug. 8–Aug. 20, 1955. Pp. 56–68. (Pp. 56–64 relied on.)